United States Patent [19]

Arnold et al.

[11] Patent Number: 5,255,387
[45] Date of Patent: Oct. 19, 1993

[54] METHOD AND APPARATUS FOR CONCURRENCY CONTROL OF SHARED DATA UPDATES AND QUERIES

[75] Inventors: Michael E. Arnold, Snow Camp, N.C.; Graham P. Bate, Gaithersburg, Md.

[73] Assignee: International Business Machines Corporation, Armonk, N.Y.

[21] Appl. No.: 515,895

[22] Filed: Apr. 27, 1990

[51] Int. Cl.$^5$ .............................................. G06F 15/40
[52] U.S. Cl. .................... 395/600; 395/425; 364/281.4; 364/281.7; 364/228.1; 364/DIG. 1
[58] Field of Search .................... 364/DIG. 1, DIG. 2; 395/600, 725, 550, 425

[56] References Cited

U.S. PATENT DOCUMENTS

| | | | |
|---|---|---|---|
| 4,181,937 | 1/1980 | Hattori et al. | 364/200 |
| 4,369,494 | 1/1983 | Bienvenu et al. | 395/550 |
| 4,393,500 | 7/1983 | Imazeki et al. | 371/13 |
| 4,445,174 | 4/1984 | Fletcher | 364/200 |
| 4,473,133 | 9/1984 | Enriquel et al. | 187/101 |
| 4,591,976 | 5/1986 | Webber et al. | 395/575 |
| 4,594,657 | 6/1986 | Byrns | 345/725 |
| 4,648,036 | 3/1987 | Gallant | 364/300 |
| 4,654,819 | 3/1987 | Stiffler | 395/425 |
| 4,675,811 | 1/1987 | Kishi et al. | 395/425 |
| 4,733,352 | 3/1988 | Nakamura et al. | 364/200 |
| 4,860,228 | 8/1989 | Carroll | 364/561 |
| 4,928,222 | 5/1990 | Vriezen et al. | 395/650 |
| 5,043,886 | 8/1991 | Witek et al. | 345/425 |

FOREIGN PATENT DOCUMENTS 218457  6/1987  United Kingdom .

OTHER PUBLICATIONS

"High Performance Database Systems —Comparison and Evaluation of Current Architectural Approaches and their Implementation", IT/Informationstechnik 29 (1987) No. 3, Munchen W. Germany, pp. 127–140.

IBM Technical Disclosure Bulletin, vol, 28, No. 1, Jun. 1985, pp. 87–88 "Delaying of On-Line Message Display".

Anon., "Integrated Concurrency and Shared Buffer Coherency Control for Multi-Systems", IBM Technical Disclosure Bulletin, vol 28 No. 10 Mar. 1986 pp. 4642–4650.

Harold Lorin, "Parallelism in Hardware and Software; Real & Apparent Concurrency" Chapters 18 & 24.

*Primary Examiner*—Thomas C. Lee
*Assistant Examiner*—Paul R. Lintz
*Attorney, Agent, or Firm*—Jerry W. Herndon

[57] ABSTRACT

Method and apparatus for shared data update and query operations. Two control fields are associated with each data block of interest. Before any data in shared memory is modified, a value different from the present value is written into one of the shared memory control fields. The shared memory data is then updated. Thereafter, the other shared memory control field is updated to the new value, thus making the values of the shared memory control fields identical once again. During query operations, the data and control fields of interest are copied into in private storage. The values of the control fields in private memory are compared. If the values are equal, the data in private storage is considered to be consistent. Otherwise, the data is considered to be in the process of being updated and the data is ignored until the values of the shared memory control fields become equal.

4 Claims, 4 Drawing Sheets

METHOD AND APPARATUS FOR CONCURRENCY CONTROL OF SHARED DATA UPDATES AND QUERIES

TECHNICAL FIELD

The invention is related generally to the field of data and database management and, particularly, to the control of access to data and database records in a timesharing or parallel processor environment for data update and query operations.

BACKGROUND OF THE INVENTION

In a multitasking data processing system, a control function must be used to insure that the integrity of data shared by more than one process of the system is maintained at all times. This is called concurrency control. Absent a concurrency control function, it is possible for data in the process of being queried by one process to be modified by an updating process after the query is begun, but before it is complete, and vice versa. In the case of uniprocessor systems, this can occur because of the timesharing nature of operation of the systems. Tasks, such as update and query, are sequentially allotted small slices of time by the system executive program during which they process their work in segments. In the case of multiprocessor systems, and especially those involving memory shared by individual processors, obvious, conflicts can arise when asynchronous processes on different processors attempt to access the shared memory. Thus, it is possible and likely that a query of data can be interrupted and the data being queried changed by another process before the query is completed. In this case, the query task would likely receive corrupted (inconsistent) data. In structured database systems, for example, concurrency control is usually done by locking data records during both update and query operations. A lock is owned by the updating or querying process. Other processes are denied access to a record while it is locked. Of course, the data integrity problem is not limited to structured databases. Any type of data which is accessible by more than one process can, in general, be subject to data corruption, absent an effective concurrency control function.

There are many concurrency control techniques which operate satisfactorily to insure data integrity. A good overview of such techniques is given in the Prentice-Hall book PARALLELISM IN HARDWARE AND SOFTWARE: REAL AND APPARENT CONCURRENCY, by Harold Lorin. However, all such techniques limit system throughput to some extent. This is caused by overhead in managing the locks and in data access delays or denials caused when locks are in effect. It is desirable to find new methods to minimize the effect on system throughput caused by the need for concurrency control.

SUMMARY OF THE INVENTION

The invention is a novel method of increasing system throughput in data management systems. Two control fields are associated with each block of data stored in shared memory. For free-form data, the control fields enclose the data of interest. For structured data such as database records, the control fields may be located in any position relative to the data fields of the record with which they are associated. Before any data in shared memory is modified, a value different from the present value is written into one of the shared memory control fields so that the shared memory control fields no longer contain identical values. The shared memory data is then updated. Thereafter, the other shared memory control field is updated to the new value, thus making the values of the shared memory control fields identical once again. During query operations, the data and control fields of interest are copied into in private storage. The values of the control fields in private memory are compared after being copied from shared memory. If the values are equal, the data of interest in private storage is considered to be consistent. Otherwise, the data is considered to be in the process of being updated, In this case, the query process ignores the data and repeats the query operation at a later time.

The invention is useful in both uniprocessor and multiprocessor environments, including tightly coupled systems in which a plurality of processors or micro processors running different processes have shared access to a common memory. System throughput is significantly increased over prior art techniques, in large part because data blocks are locked for shorter periods of time than heretofore required.

DETAILED DESCRIPTION

Figure 1:
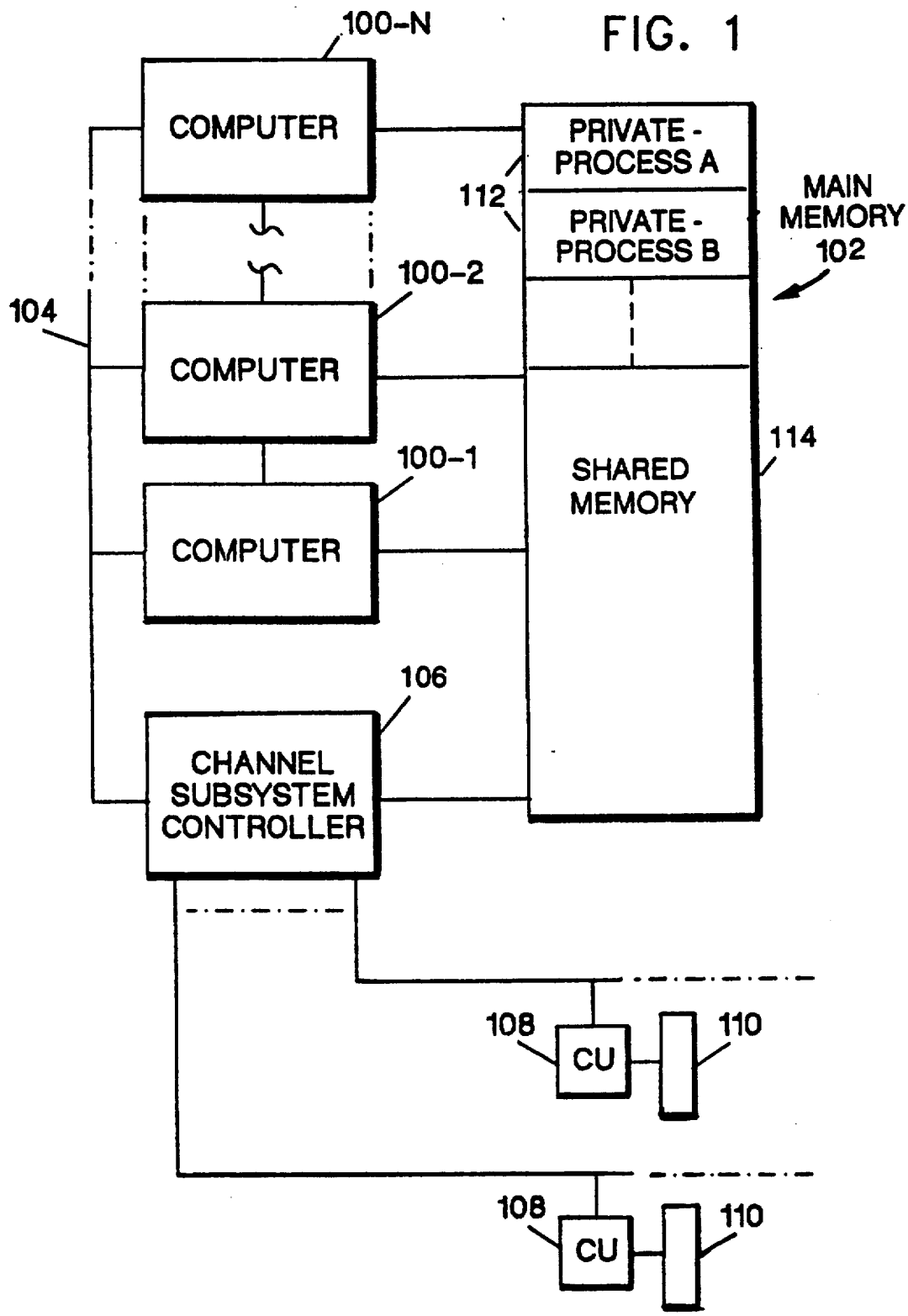
FIG. 1 shows a block diagram of an illustrative computer system suitable for practicing the invention.

FIG. 1 shows the architecture of an illustrative computer system that may be used to practice the invention. The preferred embodiment in which the invention has been implemented is structured within the System/370 (Trademark of IBM Corp.) computing system architecture. This architecture is, of course, well known. However, the invention may be practiced within virtually any computing system architecture.

The illustrative system contains one or more computers 100-1 to 100-N Each of the computers may contain a single uniprocessor capable of multitasking operation or may consist of a number of parallel processors. Each computer 100 has access to a main memory 102 for shared access of data in shared memory 114. In addition, private storage, such as 112, can be reserved for individual processes that are running in the computers 100. This private storage may be located in the main memory 102 or in the computer itself on which a process is running. Each of the computers 100 also is connected via a timeshared data bus 104 to a channel subsystem controller 106 which, in turn, is connected via channel paths to input/output devices 110 via channel units 108. The devices 110 may include printers, displays, communication controllers for connection to other systems, and the like.

Figure 2:
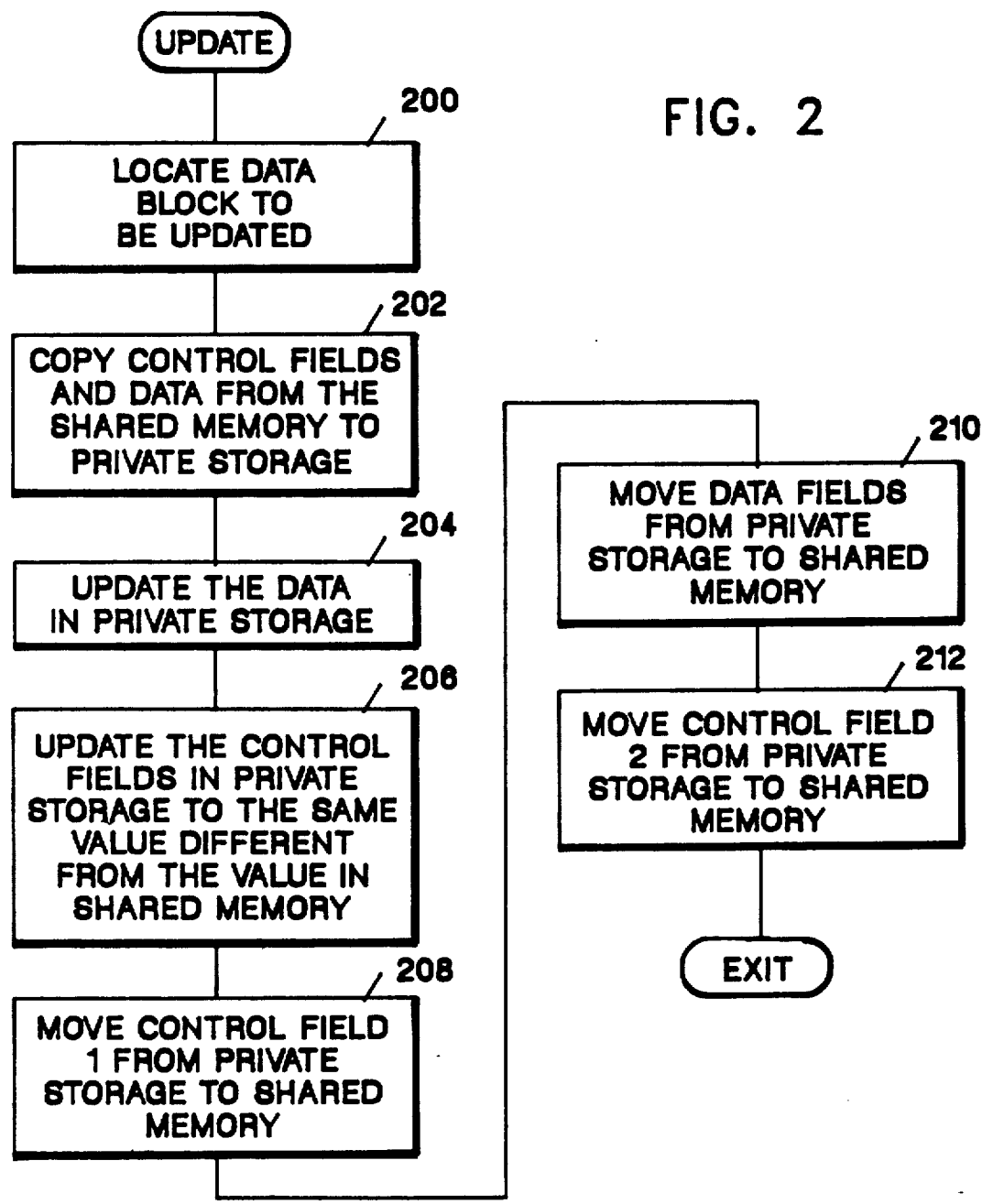
FIGS. 2 and 3 show illustrative flowcharts of data block update and query processes, respectively.
Figure 3:
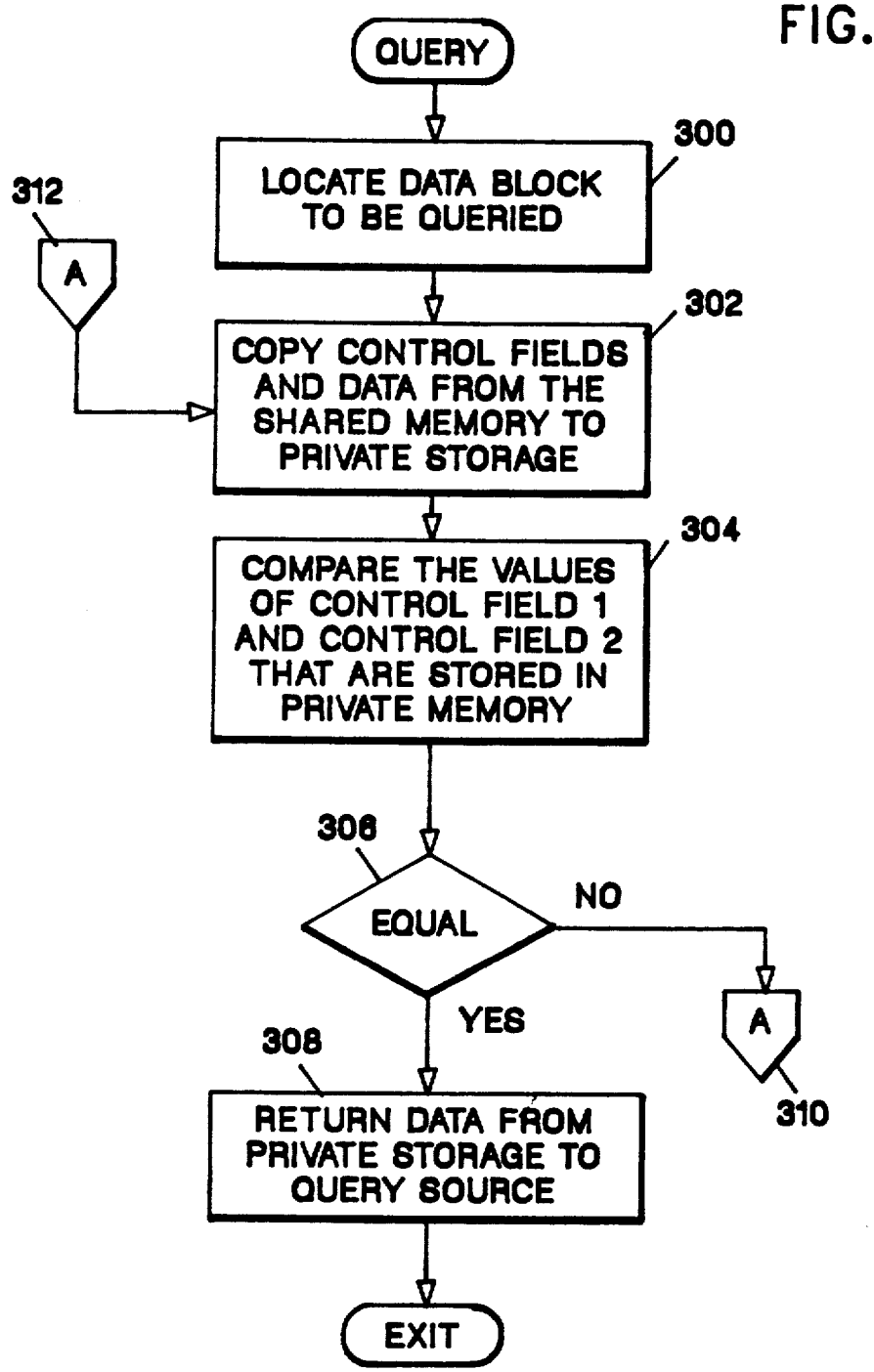

FIGS. 2 and 3 show flowcharts of illustrative embodiments of update and query processes, respectively, which run on the computers 100 and which cooperate to insure the integrity of data shared from memory 102 by query processes. Only one update process is allowed to exist in the system at any one time for the shared data of interest. This single update process may exist on any of the computers 100 and may change its residence between the computers from time to time, if desired. However, many processes for querying the shared data of interest may exist simultaneously on each of the computers 100.

Figure 4:
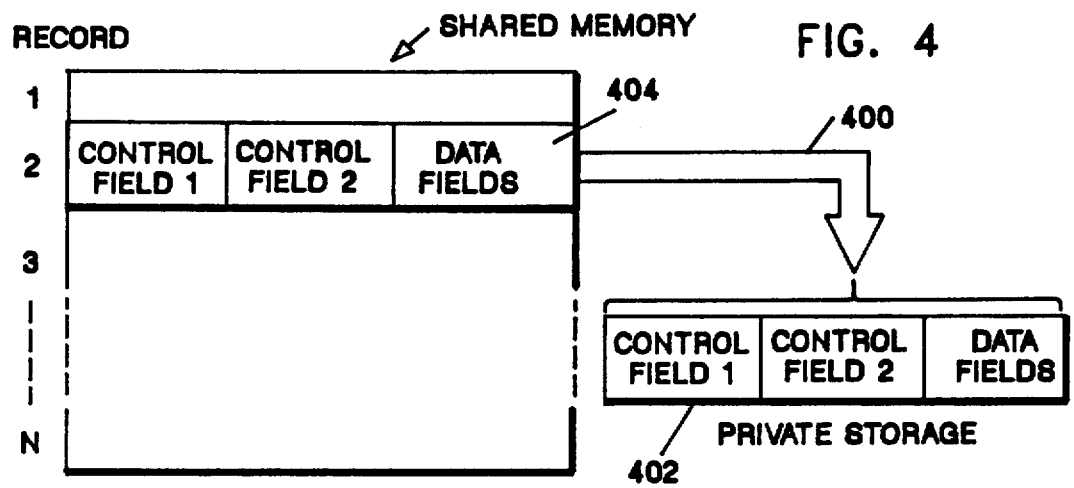
FIGS. 4 and 5 show illustrative layouts of unstructured and structured fixed-length data blocks, respectively, and private storage into which such blocks are copied during update and query operations in the preferred embodiment.
Figure 5:
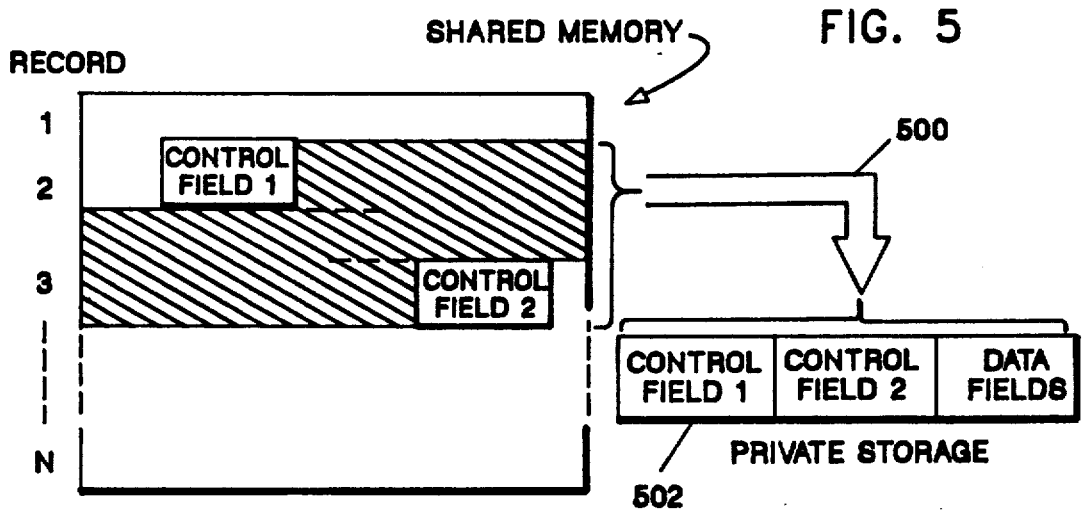

An update task begins at UPDATE in FIG. 2. Typically, an update process is given some criteria by an application that calls it. The criteria is used to locate the data of interest in shared memory. Such criteria might be, for example, an absolute or relative beginning address of the data in shared memory or search strings with which to search the shared data for a match. In any event, at step 200, a data block of interest is located in shared memory in accordance with conventional methods. The located data block is then copied from the shared memory into private storage allocated to the update process. This is illustrated in FIGS. 4 and 5 for structured database records and unstructured data, respectively. In either case, two control fields, CONTROL FIELD 1 and CONTROL FIELD 2, are associated with the data block. For unstructured or variable-length data blocks, the control fields enclose the block, which is represented by the shaded part of FIG. 4. For records or blocks of fixed size, such as are often associated with structured databases, the control fields may or may not enclose the data of interest, as desired. FIG. 4 illustrates a case in which fixed length data fields 404 are not enclosed by the control fields. The values of CONTROL FIELD 1 and CONTROL FIELD 2 with respect to each other are used to control access to the shared data by query processes. Ordinarily, the values of these two control fields are equal, meaning that the shared data associated with the control fields is considered to be in a consistent state. Unequal values of the control fields means that the shared data is being updated and may be inconsistent.

Once the data is found in shared memory at step 200, step 202 copies the data and both of the control fields into private storage allocated for use solely by the update process, as illustrated at 400 of FIG. 4 and 500 of FIG. 5. The update process modifies the data stored in its private storage 402 or 502 as it wishes, since no other process has access to the private storage. The corresponding data contained in shared memory remains in a consistent state and is so indicated by the fact that the values of CONTROL FIELD 1 and CONTROL FIELD 2 in shared memory remain equal while the private data is being updated. Thus, in accordance with the invention, multiple query processes may access shared data, even while it is being updated, without the overhead of locking the data being accessed.

At this point, we digress briefly to discuss query operations in FIG. 3 to more clearly explain the operation of the invention. Assume that while the data in the private storage of the update process above is being modified, a query of the same data undergoing update is initiated. This causes an entry to QUERY in FIG. 3. Step 300 locates the data to be queried in the same fashion as discussed for update operations. Step 302 copies the data of interest and the control fields from shared memory into private storage allocated solely to the particular query process that is executing. Step 304 compares the values of CONTROL FIELD 1 and CONTROL FIELD 2 that are now stored in the private storage of the query process. If these values are equal (step 306), the data of interest now stored in private storage is considered to be in a consistent, uncorrupted state and step 308 returns this data from the private storage to the source of the query. If the values of CONTROL FIELD 1 and CONTROL FIELD 2 in private storage are different, the query is denied because the data of interest may be inconsistent. In this event, the query process merely attempts to process the query at a later time. This is shown in FIG. 3 at 310 by means of a direct entry from 310 to 312. This creates a retry loop which repeats until CONTROL FIELD 1 and CONTROL FIELD 2 become equal. Such a looping technique will eventually work, because timesharing of tasks eventually allows the update process of FIG. 2 to complete its updating task while the query looping continues. However, a better alternative is to schedule at 310 a later entry to step 312 from the system executive control program and to then exit to the executive at step 310. Such an operation is entirely conventional and is not described in detail.

We return now to the update process of FIG. 2 to consider how to get the data which has been updated in private storage, as described above, safely back into the shared memory 102 without creating the possibility of another query obtaining corrupted data while the shared data is being restored. Once the data in private storage has been modified at step 204, step 206 sets the values of the control fields in private storage to a new and equal state. Of course, this could also be done before the private data is modified. Preferably, the new value of the control fields should be chosen so that it does not repeat very quickly. In the preferred embodiment, an appropriate number of least significant bits of the system clock is used to update the control fields. Next, at step 208, the value of CONTROL FIELD 1 in private storage is copied into CONTROL FIELD 1 in shared memory. At this point, the values of shared memory CONTROL FIELD 1 and CONTROL FIELD 2 are different. If the update process is now interrupted by a query of the same data, the query will be denied at steps 306 and 310 until the shared memory control fields become equal. The shared memory data is now updated at step 210 while the shared memory control fields contain different values. When the shared memory data is completely updated to a consistent state, step 212 copies the value of private memory CONTROL FIELD 2 into shared memory CONTROL FIELD 2. This must be accomplished without the possibility of an interruption before the write of the shared memory CONTROL FIELD 2 is completed. Many computer systems are designed so that interrupts are not allowed except at the end of a computer instruction and before the beginning of the next instruction. Updating of shared memory CONTROL FIELD 2 is not a problem in such systems. Other computer systems which allow interrupts during instructions provide some technique to temporarily disable interrupts. In the System 370 architecture, a Block Concurrent Data move instruction is used to update shared memory CONTROL FIELD 2. This instruction prohibits interruption until after the move is completed.

At this point the update process is complete. The shared memory data is consistent and the shared memory control fields contain the same new value. Consequently, a subsequent query of the data will be honored at step 206.

It is to be understood that the above described arrangements are merely illustrative of the application of principles of the invention and that other arrangements may be devised by workers skilled in the art without departing from the spirit and scope of the invention. For example, while the invention has been described in terms of a single data update process, the invention is not so limited. Multiple update processes can be permitted by the use, for example, of conventional data locks, which are observed by the update processes and ignored by the query processes.

I claim:

1. In a data processing system having one or more data updating processes for a shared set of data, a computer-implemented method of insuring access to consistent data of the set by one or more data query processes, comprising the computer-implemented steps of:

on an update operation,
a) setting a first one of first and second control fields in shared memory, said control field associated with a block of data to be updated in shared memory, to a value different from its present value,
b) updating the data block, and wherein the step of updating the data block comprises
   i) copying the block of data from shared memory into private storage,
   ii) updating the data block in private storage, and
   iii) copying the block from private storage into the shared memory,
c) setting the value of the second control field in shared memory to the value of the first control field and on a query operation
d) copying a block to be queried and its associated first and second control fields from shared memory to private storage, and
e) further processing data contained in the block from private storage only if the values of the first and second control fields in private storage are equal,
f) repeating steps d) and e) for the query operation if the values of the control fields in private storage are not equal.

2. In a data processing system having one or more data updating processes for a set of shared data, a computer-implemented method of insuring access to consistent data of the set by one or more data query processes, comprising the computer-implemented steps of:

on an update operation
a) copying a block of data to be updated and at least one of first and second control fields associated with the block and having equal values into private storage,
b) updating the data block in private storage and setting the at least one control field in private storage to a value different from that of the control fields in shared memory,
c) updating the value of one of the control fields in shared memory to the value of the at least one control field in private storage,
d) updating the data block in shared memory, and
e) updating the value of the remaining control field in shared memory to the value of the at least one control field in private storage, and on a query operation,
f) copying a block of data from shared memory to private storage, and
g) further processing the data contained in the block from private storage only if the values of the first and second control fields in private storage are equal,
h) repeating steps f) and g) if the values of the control fields in private storage are not equal.

3. In a data processing system having one or more data updating processes for a shared set of data, a computer-implemented method of insuring access to consistent data of the set by one or more data query processes, comprising the computer-implemented steps of:

a) copying a block of data to be read or updated and first and second control fields associated with the block into private storage, on an update operation
b) updating the data block in private storage and setting the first and second control fields in private storage to a value different from that of the control fields in shared memory.
c) updating the value of one of the control fields in shared memory to the value of one of the control fields in private storage,
d) copying the data block from private storage to shared memory, and
e) updating the value of the remaining control field in shared memory to the value of the remaining control field in private storage, and on a query operation,
f) further processing data contained in the block from private storage only if the values of the first and second control fields in private storage are equal,
g) repeating steps a) and f) for a query operation if the values of the control fields in private storage are not equal.

4. In a data processing system having one or more computers and a shared memory accessible by one or more computers, means in one of the computers for sequentially completing updates to data blocks in the shared memory and one or more means in one or more of the computers for concurrently querying blocks of data in shared memory in response to a query request, said update completing means comprising first means for setting a first one of first and second control fields associated with a block of data to be updated in shared memory to a value different from its present value, second means for thereafter writing update information to the data block, said second means further comprising
   i) means for copying the block of data from shared memory into private storage
   ii) means for updating the data block in private storage, and
   iii) means for copying the data block from private storage into the shared memory, third means for thereafter setting the value of the second control field in shared memory to the value of the first control field, each said query means comprising fourth means for copying a block to be queried and its associated first and second control fields from shared memory to private storage associated with the query means, and fifth means for denying the query request if the values of the first and second control fields in private storage are not equal, sixth means for repeating a denied query operation.

* * * * *